United States Patent
De Vries et al.

(10) Patent No.: US 8,856,084 B2
(45) Date of Patent: Oct. 7, 2014

(54) DATA PROCESSING METHOD AND DEVICE

(75) Inventors: Dirk Kenneth De Vries, Saint Georges d'orques (FR); Gilles Huron, Montpellier (FR)

(73) Assignee: Qualtera (FR)

( * ) Notice: Subject to any disclaimer, the term of this patent is extended or adjusted under 35 U.S.C. 154(b) by 95 days.

(21) Appl. No.: 13/448,482

(22) Filed: Apr. 17, 2012

(65) Prior Publication Data
US 2012/0271801 A1    Oct. 25, 2012

(30) Foreign Application Priority Data
Apr. 18, 2011 (EP) .................................... 11305461

(51) Int. Cl.
G06F 17/30 (2006.01)
(52) U.S. Cl.
CPC ................................ G06F 17/30551 (2013.01)
USPC ...................................................... 707/688
(58) Field of Classification Search
CPC ..................... G06F 17/30536; G06F 17/30551
USPC ...................................................... 707/688
See application file for complete search history.

(56) References Cited

U.S. PATENT DOCUMENTS

| | | | |
|---|---|---|---|
| 6,175,646 B1 * | 1/2001 | Schemmel et al. | 382/149 |
| 2002/0091675 A1 | 7/2002 | Shimokawa et al. | |
| 2002/0173911 A1 | 11/2002 | Brunet et al. | |
| 2005/0267886 A1 | 12/2005 | Pepper et al. | |
| 2006/0048025 A1 * | 3/2006 | Filipovic | 714/724 |
| 2006/0269050 A1 * | 11/2006 | Yezhuvath et al. | 379/114.01 |
| 2008/0310731 A1 * | 12/2008 | Stojancic et al. | 382/195 |

OTHER PUBLICATIONS

European Search Report dated Oct. 31, 2011 issued for European Patent Application No. 11305461.

* cited by examiner

*Primary Examiner* — Rehana Perveen
*Assistant Examiner* — Alexander Khong
(74) *Attorney, Agent, or Firm* — Kaplan Breyer Schwarz & Ottesen, LLP

(57) ABSTRACT

The invention concerns a method of processing data to provide output data based on a group of data samples having a time stamp falling within at least one rolling time period, the method comprising: receiving a new data sample and associating said new data sample with a first time stamp; updating said output data corresponding to a first rolling time period to be based on said group of data samples including said new data sample; programming a first callback based on said first time stamp and on the duration of said first rolling time period; and in response to the occurrence of said first callback, updating said output data corresponding to said first rolling time period to no longer be based on said new data sample.

10 Claims, 2 Drawing Sheets

| DS REF | TIME STAMP $T_S$ | CALLBACK $T_S + T_0$ | CALLBACK $T_S + T_1$ | ... |
|---|---|---|---|---|
| $D_0$ | MAR1, 05:15 | MAR2, 05:15 | APR1, 05:15 | |
| $D_1$ | MAR1, 11:13 | MAR2, 11:13 | APR1, 11:13 | |
| $D_2$ | MAR2, 06:15 | MAR3, 06:15 | APR2, 06:15 | |
| $D_3$ | MAR2, 18:33 | MAR3, 18:33 | APR2, 18:33 | |
| $D_0$ | MAR3, 03:45 | MAR4, 03:45 | APR3, 03:45 | |
| $D_4$ | MAR3, 05:10 | MAR4, 05:10 | APR3, 05:10 | ... |
| $D_5$ | MAR4, 00:12 | MAR5, 00:12 | APR4, 00:12 | |
| $D_6$ | MAR4, 06:51 | MAR5, 06:51 | APR4, 06:51 | |
| $D_4$ | MAR4, 09:24 | MAR5, 09:24 | APR4, 09:24 | |
| $D_7$ | MAR5, 00:06 | MAR6, 00:06 | APR5, 00:06 | |
| $D_8$ | MAR5, 12:09 | MAR6, 12:09 | APR5, 12:09 | |
| $D_9$ | MAR7, 00:18 | MAR8, 00:18 | APR7, 00:18 | |
| ⋮ | ⋮ | ⋮ | ⋮ | |

500, 502, 504, 506, 508

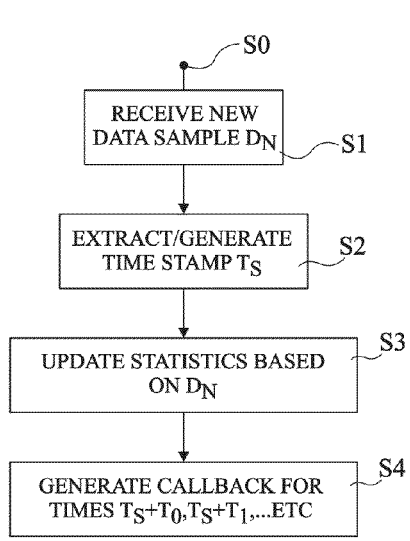
Fig 4A
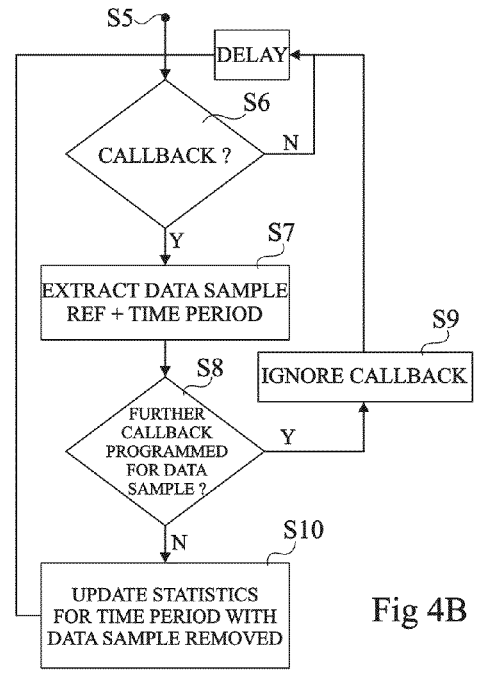
Fig 4B
| 500 ↘ | 502 | 504 | 506 | 508 | |
|---|---|---|---|---|---|
| | DS REF | TIME STAMP $T_S$ | CALLBACK $T_S + T_0$ | CALLBACK $T_S + T_1$ | ... |
| | $D_0$ | MAR1, 05:15 | MAR2, 05:15 | APR1, 05:15 | |
| | $D_1$ | MAR1, 11:13 | MAR2, 11:13 | APR1, 11:13 | |
| | $D_2$ | MAR2, 06:15 | MAR3, 06:15 | APR2, 06:15 | |
| | $D_3$ | MAR2, 18:33 | MAR3, 18:33 | APR2, 18:33 | |
| | $D_0$ | MAR3, 03:45 | MAR4, 03:45 | APR3, 03:45 | |
| | $D_4$ | MAR3, 05:10 | MAR4, 05:10 | APR3, 05:10 | ... |
| | $D_5$ | MAR4, 00:12 | MAR5, 00:12 | APR4, 00:12 | |
| | $D_6$ | MAR4, 06:51 | MAR5, 06:51 | APR4, 06:51 | |
| | $D_4$ | MAR4, 09:24 | MAR5, 09:24 | APR4, 09:24 | |
| | $D_7$ | MAR5, 00:06 | MAR6, 00:06 | APR5, 00:06 | |
| | $D_8$ | MAR5, 12:09 | MAR6, 12:09 | APR5, 12:09 | |
| | $D_9$ | MAR7, 00:18 | MAR8, 00:18 | APR7, 00:18 | |
| | ⋮ | ⋮ | ⋮ | ⋮ | |
Fig 5A
| 510 ↘ | DATA SAMPLES $T_0$ | | DATA SAMPLES $T_1$ | | ... |
|---|---|---|---|---|---|
| | DS REF | DATA | DS REF | DATA | |
| | $D_{26}$ $D_{27}$ | ... | $D_0$ ⋮ $D_{27}$ | ... | |
| 512 → | MEAN($D_{26}$,$D_{27}$) | | MEAN($D_0$...$D_{27}$) | 512 | |
Fig 5B

DATA PROCESSING METHOD AND DEVICE

FIELD OF THE INVENTION

The present invention relates to a method and circuit for data processing, and in particular for generating output data based on a time varying set of data samples.

BACKGROUND TO THE INVENTION

In order to facilitate user analysis of sets of data, a computer is often used to process the data and generate statistical and/or graphical representations.

In many applications, the input data may be time varying. For example, in the field of finance, a computer may generate graphs or other statistical representations of financial data, such as stock market prices, interest rates, etc. Equally, in other fields, such as the field of electronic circuit wafer testing, a computer can be used to graphically represent test data that indicates problems in one or more dies on each wafer.

In such applications, the age of the data samples may have a bearing on their importance to the user, and thus the user may have the option of selecting to view statistics and/or graphics based on the data samples of a limited history period, such as the past 24 hours or the past 7 days, in other words based on rolling time periods that are constantly changing based on the current time and date.

There are difficulties in generating statistical/graphical representations for such rolling time periods.

Indeed, when a user requests to see new statistical/graphical representations of the data samples of a rolling time period, one approach would be to process the request in real time, by assembling the appropriate data samples, and then generating the desired representations before displaying the results to the user. However, in certain applications where there are large numbers of data samples and/or complex processing to be performed on the data samples, this leads to an unacceptable delay between the user request and the display of the results.

An alternative approach would be to schedule periodic recalculations of the statistical/graphical representations based on the appropriate data samples of the rolling time period. This has the advantage that when a user requests to see the statistical/graphic representations, they may be displayed immediately. However, such an approach has the disadvantage that the results are not always up to date, as they will not include any new data samples received since the last periodic recalculation.

SUMMARY OF THE INVENTION

It is an aim of embodiments of the present invention to at least partially address one or more disadvantages in the prior art.

According to one aspect of the present invention, there is provided a method of processing data to provide output data based on a group of data samples having a time stamp falling within at least one rolling time period, said at least one rolling time period corresponding to a time duration back in history from a current time ($T_C$), the method comprising: receiving a new data sample and associating said new data sample with a first time stamp; updating said output data corresponding to a first rolling time period to be based on said group of data samples including said new data sample; programming a first callback based on said first time stamp and on the duration of said first rolling time period, the first callback indicating a time and date that it is to occur and a reference of the new data sample; and in response to the occurrence of said first callback, updating said output data corresponding to said first rolling time period to no longer be based on said new data sample.

According to one embodiment, the method further comprises, after receiving said new data sample, the steps of: updating said output data corresponding to a second rolling time period to be based on said group of data samples including said new data sample; programming a second callback based on said first time stamp and on the duration of a second rolling time period, the second callback indicating a time and date that it is to occur and a reference of the new data sample; and in response to the occurrence of said second callback, updating said output data corresponding to said second rolling time period to no longer be based on said new data sample.

According to another embodiment, the first time stamp corresponds to the creation time of said new data sample.

According to another embodiment, the method further comprises, before said step of associating said new data sample with a first time stamp, the step of generating said first time stamp based on the time that said new data sample is received.

According to another embodiment, the method further comprises, prior to said step of updating said output data corresponding to said first rolling time period, the step of verifying that there are no other callbacks relating to said first rolling time period and said new data sample.

According to another embodiment, the output data comprises at least one of: a mean value of at least one data value of each of the group of data samples; a median value of at least one data value of each of the group of data samples; a standard deviation of at least one data value of each of the group of data samples; and a graphical representation of at least one data value of each of said group of data samples.

According to another embodiment, each data sample of said group of data samples corresponds to a test data file for a corresponding silicon wafer, and said output data indicates faults that have occurred in one or more dies of said wafer.

According to a further aspect of the present invention, there is provided a digital medium storing a computer program that when executed on a processor, results in the implementation of the above method.

According to yet a further aspect of the present invention, there is provided a processing device arranged to process data to provide output data based on a group of data samples having a time stamp falling within at least one rolling time period, said at least one rolling time period corresponding to a time duration back in history from a current time ($T_C$), the device comprising: at least one input adapted to receive a new data sample; a memory arranged to store output data corresponding to a group of data samples of a first rolling time period; and at least one processor configured to: associate said new data sample with a first time stamp; update said output data corresponding to said first rolling time period to be based on said group of data samples including said new data sample; program a first callback based on said first time stamp and on the duration of said first rolling time period, the first callback indicating a time and date that it is to occur and a reference of the new data sample; and in response to the occurrence of said first callback, update said output data corresponding to said first rolling time period to no longer be based on said new data sample.

According to one embodiment, the device further comprising a display for displaying said output data.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIGS. 4A and 4B are flow diagrams showing steps in a method according to embodiments of the present invention; and FIGS. 5A and 5B illustrate examples of tables maintained in a memory of the device of FIG. 2 according to embodiments of the present invention.

DETAILED DESCRIPTION OF EMBODIMENTS OF THE PRESENT INVENTION

In the following, only those features useful for an understanding of the present disclosure will be discussed in detail. Other features, such as the particular applications of the embodiments disclosed herein will not be discussed in detail, and it will be apparent to those skilled in the art that the embodiments could be applied to a wide range of applications in which data is processed according to rolling time periods.

Figure 1:
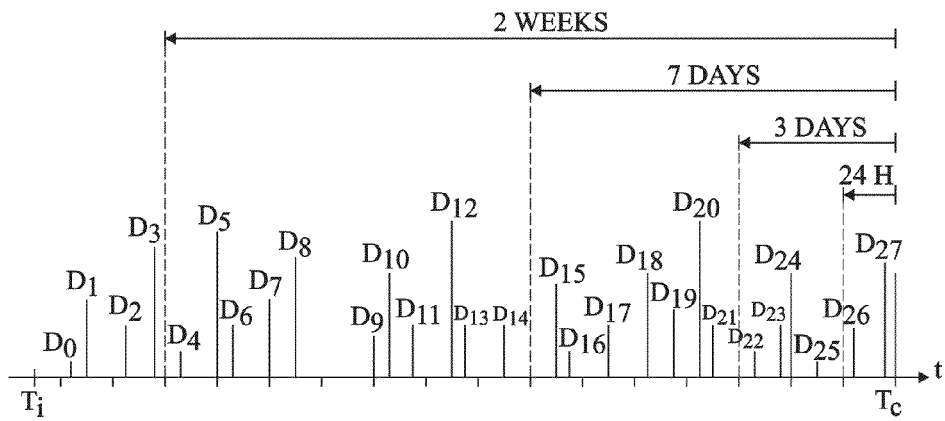
FIG. 1 illustrates a set of input data according to one example.

FIG. 1 is a graph illustrating an example of a set of data samples $D_0$ to $D_{27}$ received between an initial time $T_i$ and a current time $T_C$. Each data sample has a certain value represented in FIG. 1 by the magnitude of a line corresponding to each data sample. More generally, the term "data sample" is used herein to designate one or more data values associated with a given time value.

In the example of FIG. 1, four rolling time periods are defined, each corresponding to a different time duration back in history from the current time $T_C$. The time durations in the example of FIG. 1 are 24 hours, 3 days, 7 days and 2 weeks. The data samples $D_4$ to $D_{27}$ fall within the 2 week period, the data samples $D_{15}$ to $D_{27}$ fall within the 7 day period, the data samples $D_{22}$ to $D_{27}$ fall within the 3 day period, and only the last two data samples $D_{26}$ and $D_{27}$ fall within the last 24 hours.

For example, any or all of the four rolling time periods of FIG. 1 may be selected by a user as the basis for generating output data. Output data as defined herein corresponds to any data resulting from processing one or more values of the corresponding data samples. For example, the output data could be in the form of numerical data, such as a mean or median value, or a standard deviation. Alternatively, the output data could be in the form of a graphical representation, such as a graph, of one or more data values of each data sample.

It will be apparent to those skilled in the art that the data samples of FIG. 1 are merely an example of a simple data set aimed at aiding an understanding of the present disclosure. In practise, the number of data samples could be far greater, for example numbering hundreds, thousands or even millions. Furthermore, the number of data samples occurring within a certain time period will depend on the nature of subject that they represent, and the data samples could occur aperiodically, as shown in the example of FIG. 1, or periodically, for example hourly, daily or weekly. Furthermore, the data samples could each comprise tens or hundreds of data values.

Figure 2:
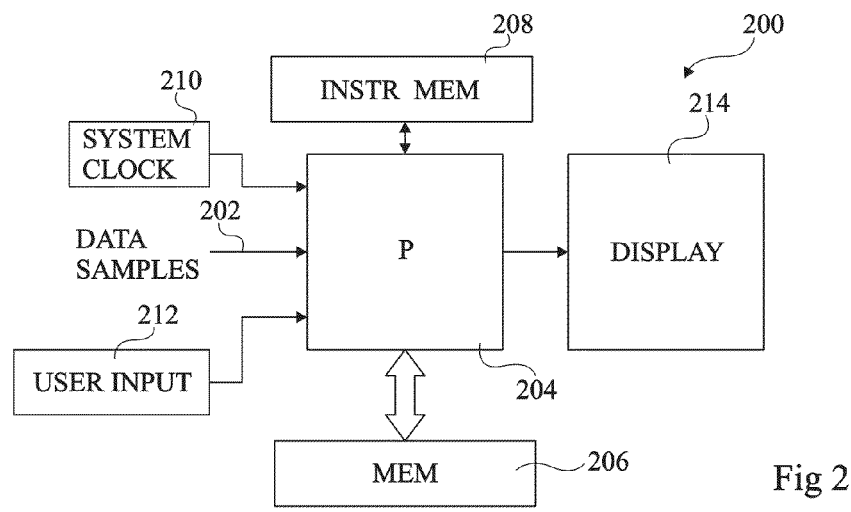
FIG. 2 illustrates a processing device according to an embodiment of the present invention.

FIG. 2 illustrates a processing device 200 configured to process data samples received via an input line 202. Device 200 comprises a processing unit 204, which receives the data samples, and stores them in a memory 206. Furthermore, the processing unit 204 is coupled to an instruction memory 208, a system clock 210, and a user input 212. The instruction memory 208 stores a program that controls the operation of the processing unit 204. The system clock 210 provides time information, for example for use in generating time stamps. The user input 212 receives a user selection, for example via a keyboard and/or mouse, for example indicating a rolling time period for which the output data is generated. Furthermore, a display 214 is for example provided for displaying the output data.

The memories 208 and 206 are for example implemented by one or more volatile and/or non-volatile memories, such as RAM (random access memory), a hard disk, a Flash drive, or other type of memory device.

Operation of the processing device 200 will be described in more detail below with reference to the flow diagrams of FIGS. 4A and 4B.

Figure 3:
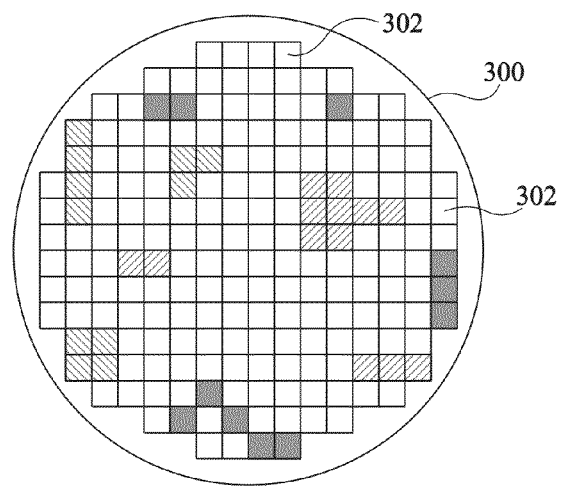
FIG. 3 illustrates a wafer comprising dies based on which a data sample may be based according to embodiments of the present invention.

FIG. 3 schematically illustrates in plan view a silicon wafer 300, and provides an example of the information that may comprise each data sample according to some embodiments described herein. In particular, the wafer 300, which is in the form of a substantially circular disc, comprises an array of rectangular dies 302. Each die corresponds to an integrated circuit. After fabrication, a test run of the wafer, sometimes referred to as a "wafer probe" or "electrical wafer sort", comprises testing the circuit formed by each die. One or more of the dies may be found to be faulty, and in the example of FIG. 3, the dies represented as hollow squares have passed the test run, whereas the dies represented by solid squares or diagonally shaded squares have failed the test run for one of a number of reasons.

For example, the solid squares represent dies that failed due to scratches on the surface of the wafer, the squares with diagonal stripes going from bottom left to top right represent dies that failed due to errors detected during the test run or during fabrication, and the squares with diagonal stripes going from bottom right to top left represent dies that fail predefined power consumption limits for the part.

In one example, each of the data samples $D_0$ to $D_{27}$ of FIG. 1 corresponds to data resulting from the test run of a different wafer. For example, this data includes the total number of failed dies on each wafer, the number of failed dies in each category and/or the locations of the failed dies on each wafer, for example provided as x,y coordinates. The data can also include the number of dies assigned to a specific "test bin". Furthermore, the data may include statistics on parametric data captured during the testing process, such as wafer level mean or median values of the maximum operating frequency (FMAX), the standby power consumption, and/or other analog parameters such as Total Harmonic Distortion (THD).

FIG. 4A is a flow diagram showing steps in a method of processing data samples based on rolling time periods according to one embodiment. Such steps are for example implemented by the processor 204 of FIG. 2, based on instructions stored in the instruction memory 208.

From a start point S0, an initial step S1 involves receiving a new data sample $D_N$.

In a next step S2, a time stamp associated with the new data sample $D_N$ is either extracted from the data sample, or generated. In particular, in some cases the data sample is already associated with a time stamp. In the case of a wafer test, the time stamp for example corresponds to the time that the test run is initiated, and is included with the test data. Alternatively, the data sample may not be associated with a time stamp, and/or it may be desired to assign a time stamp corresponding to the time that the data sample is received by the data processing system. In such a case, a data stamp may be generated based on time information determined using the system clock 210 of FIG. 2.

The next step is S3, in which the statistics are updated based on the new data value $D_N$. In particular, it is assumed that the processing device 200 already stores one or more data samples in the memory 206, and that the statistical/graphical representation of such data samples has already been calculated for each rolling time period offered by the system. To update these representations based on the new data value, it may not be necessary to process again all the data samples. For example, in the case that the output data is a graph showing the fluctuations of one or more data values of each data sample over time, to include the new data sample may involve adding a new point on the graph. Alternatively, in the case that the output data comprises a mean value or a standard deviation, the weighting of the new data value based on the number of existing data values can be used to adjust the already calculated mean or standard deviation in view of the new value, as will be understood by those skilled in the art. In any case, the updated output data is for example stored in the memory 206, ready to be loaded in the case of a future request by a user.

In a next step S4, a callback is generated, for each of the rolling time periods, corresponding to the new data sample $D_N$. In particular, calling the time of the time stamp $T_s$ of the data sample, and calling the time durations spanned by each of the rolling time periods $T_0$, $T_1$, $T_2$ etc., the callbacks are for example generated to occur at times $T_s+T_0$, $T_s+T_1$, $T_s+T_2$ ... etc. For example, assuming that the time period $T_0$ corresponds to a rolling time period of 24 hours, and the callback will be generated to occur 24 hours after the time indicated by the stamp of the data sample $D_N$. The number of callbacks that are generated will depend on the number of rolling time periods offered by the data processing system. In the example of FIG. 1, there are four rolling time periods, and thus four callbacks are for example generated, occurring 24 hours, 3 days, 7 days and 2 weeks after the time stamp of the new data sample.

The callbacks generated in step S4 trigger another update of the output data, based on the data samples without the new data sample $D_N$, as will now be described with reference to FIG. 4B.

FIG. 4B is a flow diagram illustrating steps in a method of processing a callback event.

From a start point S5, in which the data processing system is for example idle, the occurrence of a callback is detected. In particular, a step S6 involves determining whether or not a callback has been triggered, and if not, the method returns to the start point S5, for example after a short delay. If a callback has occurred, the next step is S7.

In step S7, the data sample corresponding to the callback is identified. For example, the callback indicates a reference of the data sample to which it corresponds, and this reference can be extracted. Furthermore, the callback for example indicates to which rolling time period it corresponds, and thereby identifies which output data it concerns. For example, a callback could be programmed to have the following format:

CALLBACK REF=TIME+DATE, DATA SAMPLE REF, ROLLING TP where "CALLBACK REF" is a reference of the callback, "TIME+DATE" is the time and date that the callback is to be triggered, "DATA SAMPLE REF" indicates the data sample to which the callback corresponds, and "ROLLING TP" indicates which of the rolling time periods is concerned by the callback.

With reference again to FIG. 4B, a next step S8, which is optional, involves determining whether there are any further callbacks programmed for the same data sample and the same rolling time period. For example, in some cases a new data sample may correspond to an update of the data already received by the system. Thus, its effect could be to overwrite the existing data. In such a case, for the purpose of generating the rolling time periods, it is the latest time stamp that should count. Thus, if there is one or more further callbacks, the current callback is ignored in step S9, and the method returns to the start point S5, for example after a short delay. However, if there are no further callbacks, the next step is S10.

In S10, the statistics for the rolling time period identified by the callback are updated to be based on data samples without the data sample identified by the callback. As with the initial update step S3 of FIG. 4A, this second updating step may be achieved without performing again the data processing of all the data samples falling in the corresponding rolling time period, but merely by adjusting the output values based on the data sample to be removed. After S10, the method returns to the start point S5, ready for a subsequent callback.

FIGS. 5A and 5B illustrate examples of tables that are for example maintained in the memory 206 of the data processing device 200.

FIG. 5A illustrates a table 500 that stores a record of all of the data samples that are received, along with the callbacks corresponding to each rolling time period. In particular, a column 502 indicates a reference DS REF of each data sample, a column 504 indicates the time stamp $T_s$ of each data sample and columns 506 and 508 indicate the times or callbacks in the example that the rolling time periods have a duration of 24 hours and one calendar month respectively. It will be noted that data samples for the data references $D_0$ and $D_4$ are each present twice in the table, and thus there are corresponding callbacks for each of these data samples. However, when the first callback at $T_S+T_0$ for each of the data samples $D_0$ and $D_4$ occurs 24 hours after the time stamp $T_S$, the corresponding updated data samples have not yet been received, and thus the statistics for this time period will still be updated in step S10 of FIG. 4B. However, when the first callback at $T_S+T_1$ occurs one calendar month after $T_S$ for each of the data samples $D_0$ and $D_4$, the second callback at $T_S+T_1$ will already exist, and thus the first callbacks will be ignored in step S9 of FIG. 4B.

FIG. 5B illustrates a table 510 storing the data samples corresponding to each rolling time period duration $T_0$, $T_1$ etc., and also, for each set of data samples, the corresponding output data 512. In the example of FIG. 5B, the output data for the rolling time period $T_0$ comprises the mean of the data samples $D_{26}$ and $D_{27}$ falling in this period, while the output data for the rolling time period $T_1$ comprises the mean of the data samples $D_0$ to $D_{27}$ falling in this period.

In response to a user request to view a representation of the data samples of one of the rolling time periods, the output data 512 is immediately available. Furthermore, in response to the arrival of a new data sample, or the occurrence of a callback, the list of data samples in the tables 510 are updated, and the output data 512 adjusted accordingly. The tables 510 may store the data values of each data sample, or alternatively they may simply store the reference of the data sample, allowing it to be retrieved from memory.

An advantage of the embodiments described herein is that output data based on data samples of one or more rolling time periods can be generated in an efficient manner, and in such a way that the output data is always updated shortly after the arrival of new data samples. Furthermore, an advantage of programming a callback after receiving each new data sample is that the rolling time periods can be maintained in a simple fashion, without the need of complicated processing operations.

Having thus described at least one illustrative embodiment of the invention, various alterations, modifications and improvements will readily occur to those skilled in the art.

For example, it will be apparent to those skilled in the art that the tables of FIGS. 5A and 5B illustrate just one example implementation, and that there are many other ways of implementing the methods described herein. Furthermore, it will be apparent to those skilled in the art that, while a software implementation has been described, the methods disclosed herein could be implemented at least partially in hardware.

The invention claimed is:

1. A method of processing data to provide at least one of statistical and graphical output data based on a group of data samples having a time stamp falling within at least one rolling time period, said at least one rolling time period corresponding to a time duration back in history from a current time, the method comprising:
   receiving a new data sample and associating said new data sample with a first time stamp;
   updating said at least one of said statistical and graphical output data corresponding to a first rolling time period to be based on said group of data samples including said new data sample;
   programming a first callback based on said first time stamp and on the duration of said first rolling time period, the first callback indicating a time and date that it is to occur and a reference of the new data sample;
   detecting the occurrence of the first callback;
   identifying the new data sample as corresponding to the first callback based on the reference of the new data sample; and
   in response to the occurrence of said first callback, updating said at least one of said statistical and graphical output data corresponding to said first rolling time period to no longer be based on said new data sample.

2. The method of claim 1, further comprising, after receiving said new data sample, the steps of:
   updating said at least one of said statistical and graphical output data corresponding to a second rolling time period to be based on said group of data samples including said new data sample;
   programming a second callback based on said first time stamp and on the duration of a second rolling time period, the second callback indicating a time and date that it is to occur and a reference of the new data sample; and
   in response to the occurrence of said second callback, updating said at least one of said statistical and graphical output data corresponding to said second rolling time period to no longer be based on said new data sample.

3. The method of claim 1, wherein said first time stamp corresponds to the creation time of said new data sample.

4. The method of claim 1, further comprising, before said step of associating said new data sample with a first time stamp, the step of generating said first time stamp based on the time that said new data sample is received.

5. The method of claim 1, further comprising, prior to said step of updating said at least one of said statistical and graphical output data corresponding to said first rolling time period, the step of verifying that there are no other callbacks relating to said first rolling time period and said new data sample.

6. The method of claim 1, wherein said at least one of said statistical and graphical output data comprises at least one of:
   a mean value of at least one data value of each of the group of data samples;
   a median value of at least one data value of each of the group of data samples;
   a standard deviation of at least one data value of each of the group of data samples; and
   a graphical representation of at least one data value of each of said group of data samples.

7. The method of claim 1, wherein each data sample of said group of data samples corresponds to a test data file for a corresponding silicon wafer, and said at least one of said statistical and graphical output data indicates faults that have occurred in one or more dies of said wafer.

8. A digital non-transitory medium storing a computer program that when executed on a processor, results in the implementation of the method of claim 1.

9. A processing device arranged to process data to provide at least one of statistical and graphical output data based on a group of data samples having a time stamp falling within at least one rolling time period, said at least one rolling time period corresponding to a time duration back in time from a current time, the device comprising:
   at least one input adapted to receive a new data sample;
   a memory arranged to store output data corresponding to a group of data samples of a first rolling time period; and
   at least one processor configured to:
   associate said new data sample with a first time stamp;
   update said at least one of said statistical and graphical output data corresponding to said first rolling time period to be based on said group of data samples including said new data sample;
   program a first callback based on said first time stamp and on the duration of said first rolling time period, the first callback indicating a time and date that it is to occur and a reference of the new data sample;
   detect the occurrence of the first callback;
   identify the new data sample as corresponding to the first callback based on the reference of the new data sample; and
      in response to the occurrence of said first callback, update said at least one of said statistical and graphical output data corresponding to said first rolling time period to no longer be based on said new data sample.

10. The device of claim 9, further comprising a display for displaying said at least one of said statistical and graphical output data.

* * * * *